United States Patent [19]
Nagy

[11] 3,940,696
[45] Feb. 24, 1976

[54] HIGH FREQUENCY, SHORT PULSE, BAND LIMITED RADAR PULSE GENERATOR FOR ULTRASHORT RANGE RADAR SYSTEMS

[75] Inventor: Louis L. Nagy, Warren, Mich.

[73] Assignee: General Motors Corporation, Detroit, Mich.

[22] Filed: Nov. 18, 1974

[21] Appl. No.: 525,004

[52] U.S. Cl............................. 325/141; 343/17.1 R
[51] Int. Cl.²............................................ H04B 1/04
[58] Field of Search........... 325/120, 121, 125, 129, 325/130, 141; 343/17.1 R

[56] References Cited
UNITED STATES PATENTS 3,603,991  9/1971  Bernstein....................... 343/17.1 R
3,858,204  12/1974  Robbins......................... 343/17.1 R

*Primary Examiner*—Albert J. Mayer
*Attorney, Agent, or Firm*—Howard N. Conkey

[57] ABSTRACT

An RF pulse generator including a voltage pulse generator comprised of an avalanche transistor biased for operation in its avalanche region. A delay line coupled to the avalanche transistor causes the avalanche transistor to switch between its on and off states to generate repeated high voltage subnanosecond voltage pulses. These pulses control a varactor diode RF switch supplied with an RF signal to generate subnanosecond coherent RF pulses which are transmitted and detected in an ultrashort range radar system.

2 Claims, 3 Drawing Figures

HIGH FREQUENCY, SHORT PULSE, BAND LIMITED RADAR PULSE GENERATOR FOR ULTRASHORT RANGE RADAR SYSTEMS

This invention relates to an RF pulse generator. More specifically, this invention relates to an apparatus for generating high frequency, subnanosecond, coherent RF pulses for radiation and detection in an ultrashort range pulse radar system.

There has been increasing interest in the use of radar in short range applications. One such application is object detection for automotive vehicles wherein the range of interest may be between zero and twenty feet. Many radar systems have been considered for use in short range application. They include continuous wave, frequency modulation and incoherent pulse systems.

Coherent RF pulse radar systems have not generally been considered for ultrashort range applications even though such a system has inherent advantages over other systems as a result of the difficult task of generating the required very broad but band-limited subnanosecond RF pulse required for desired range resolution. The general object of this invention is to provide a coherent RF pulse generator for use in an ultrashort range pulse radar system.

It is another object of this invention to provide an RF pulse generator for generating subnanosecond coherent RF pulses having a high repetition rate.

It is another object of this invention to provide an RF pulse generator for generating subnanosecond coherent RF pulses having a high repetition rate and having minimum range side lobes to provide improved range resolution in an ultrashort range pulse radar system.

It is another object of this invention to provide an RF pulse generator for generating coherent RF pulses having a high repetition rate and having detectable envelopes with rise and fall times of less than a nanosecond and pulse widths of approximately one nanosecond.

These and other objects of this invention are achieved by the use of a voltage pulse generator which generates a subnanosecond voltage pulse controlling an RF switch supplied with RF energy to generate a subnanosecond RF pulse. The pulse generator takes the form of an avalanche transistor biased for operation in the avalanche region. The avalanche transistor, which has a high breakdown voltage and a high multiplication factor, is caused to switch between its on and off stages by a delay line coupled thereto. The length of the delay line is such that the propagation time of a voltage transient both ways thereon is greater than the time required for the avalanche transistor to switch from its off state to its on state. The delay line further has an impedance slightly greater than the impedance of the radar system as seen at the output of the voltage pulse generator. The voltage pulse from the voltage pulse generator is coupled to a varactor diode RF switch supplied with RF energy and which is biased to an off state. The RF switch is driven by the pulse to generate a subnanosecond RF pulse for transmission and detection in a pulse radar system.

The invention may be best understood by reference to the following description of a preferred embodiment and the drawings in which.

Figure 1:
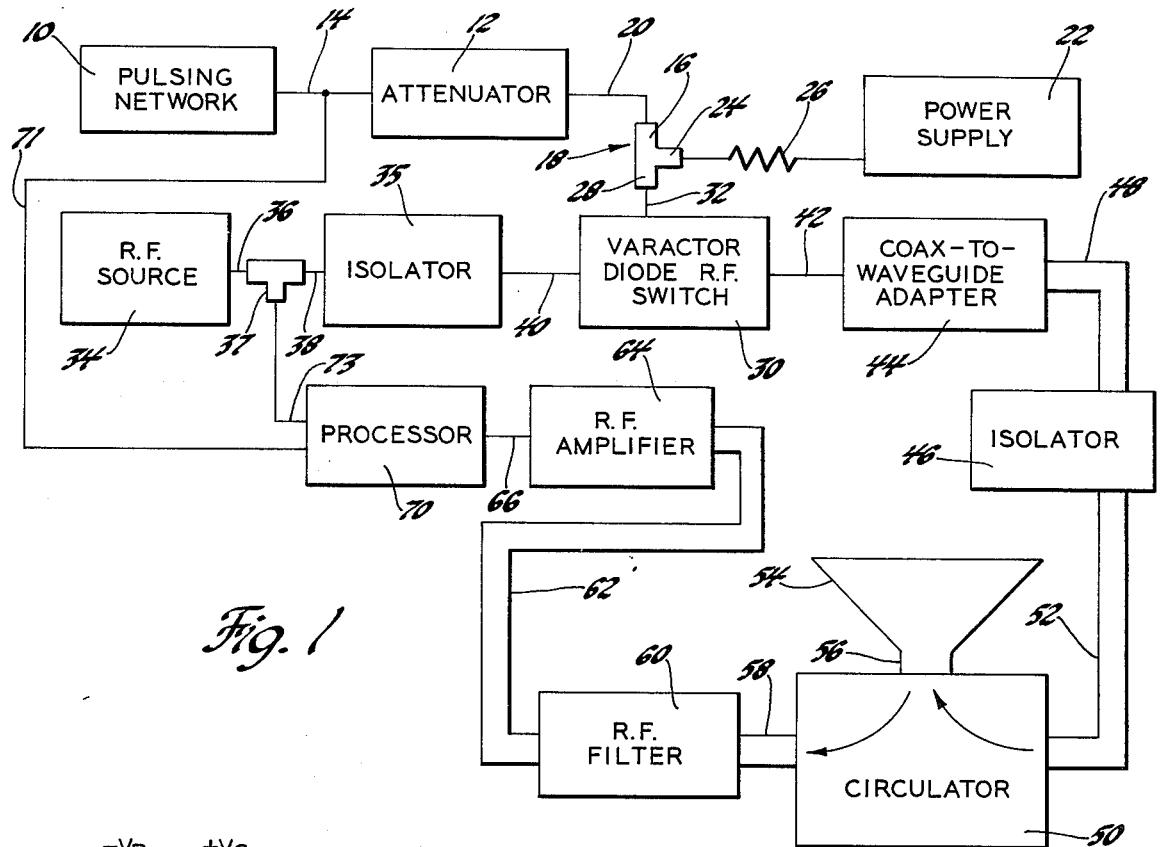
FIG. 1 is a block diagram of the radar system incorporating the principles of the invention.

Referring to FIG. 1, there is illustrated the block diagram of the basic RF circuit of this invention. A pulsing network 10 generates subnanosecond voltage pulses at a high repetition rate which are coupled to an attenuator 12 through a coaxial cable 14. The output of the attenuator 12 is coupled to one input leg 16 of an inside DC block/monitor tee 18 through a coaxial cable 20. A power supply 22 supplies a negative DC voltage to a second input leg 24 of the inside DC block/monitor tee 18 through a feed-through load 26. An output leg 28 of the inside DC block/monitor tee 18 is coupled to a varactor diode RF switch 30 through a coaxial cable 32.

The inside DC block/monitor tee 18 is a conventional tee which functions to couple the voltage pulses applied to its input leg 16 and the negative voltage applied to its input leg 24 through its output leg 28 to the varactor diode RF switch 30 and functions to prevent the negative voltage from the power supply 22 from being coupled back through the attenuator 12 to the pulsing network 10.

An RF source 34, which may be a Gunn diode oscillator, generates an RF signal having a frequency, for example, of 10.525 gHz. This RF signal is coupled to an isolator 35 through a coaxial cable 36, directional coupler 37 and a coaxial cable 38. The output of the isolator 35 is coupled to the varactor diode RF switch 30 through a coaxial cable 40.

The attenuator 12 functions to attenuate reflected energy from the varactor diode RF switch 30 and the isolator 35 functions to prevent reflected RF energy from the varactor diode RF switch 30 from returning to the RF source 34.

The varactor diode RF switch 30 is of the type which includes a varactor diode which attenuates RF energy supplied thereto as a function of its bias. This type of RF switch may be either a series of shunt type. In the preferred embodiment, the shunt type is used which attenuates or reflects the RF signal from the RF source 34 as a direct function of the magnitude of the reverse bias of the varactor diode. The negative voltage output of the power supply 22 functions to reverse bias the varactor diode in the RF switch 30 so that it normally attenuates or reflects the RF signal from the RF source 34. This reverse bias may have a magnitude of, for example, 11 volts. Consequently, the varactor diode RF switch 30 is normally biased so as to attenuate the RF energy supplied thereto. The attenuation may be, for example, -24 dB with a reverse bias of 11 volts across the varactor diode. By decreasing the magnitude of the negative bias voltage, the impedance of the varactor diode varies and attenuation of the RF signal supplied to the varactor diode RF switch 30 decreases.

The RF signal transmitted through the varactor diode RF switch 30 is at a maximum magnitude, for example 0.5 dB, when the reverse bias of the varactor diode is zero. Further, as a result of the capacitance characteristics of a varactor diode, the maximum RF output of the RF switch 30 is achieved only when the varactor diode is at a bias of zero volts. The positive voltage pulses from the pulsing network 10 coupled to the varactor diode RF switch 30 each has a magnitude greater than the reverse bias voltage of the varactor diode therein as set by the power supply 22. The magnitude of the voltage pulses is made greater than the reverse bias of the varactor diode in the varactor diode RF switch 30 so as to reduce the rise time of the RF signal at the output of the varactor diode RF switch 30 to a minimum. Further, the magnitude of the voltage pulses is selected so that the RF signal transmitted through the varactor diode RF switch 30 does not dwell at its peak power level. The resulting output of the varactor diode RF switch 30 are subnanosecond coherent RF pulses at a high repetition rate.

The RF pulses from the varactor diode RF switch 30 are coupled by coaxial cable 42 to a coaxial-to-waveguide adapter 44. The RF pulses are then coupled to an isolator 46 through a waveguide 48 and then to an input of a circulator 50 through a waveguide 52. The RF pulses are then directed by the circulator 50 to an antenna 54 through a waveguide 56. The antenna 54 radiates the RF pulse into space toward a reflecting target and is reflected by the target toward the antenna 54. The returned RF pulse is received and coupled by the antenna 54 to the circulator 50 through the waveguide 56. The circulator 50 directs the returned RF pulse to a waveguide 58 which couples the RF pulse to an RF filter 60. The output of the RF filter 60 is coupled through a waveguide 62 to an RF amplifier 64 whose output is coupled by a coaxial cable 66 to a processor 70.

The voltage pulses generated by the pulsing network 10 are coupled to the processor 70 through a coaxial cable 71 and the RF signal from the RF source 34 is coupled to the processor 70 through the coaxial cable 36, the directional coupler 37 and a coaxial cable 73. The processor 70 may include a detector and a mixer and functions to determine parameters such as range to an object, the rate of change of range to the object and object identity.

Figure 2:
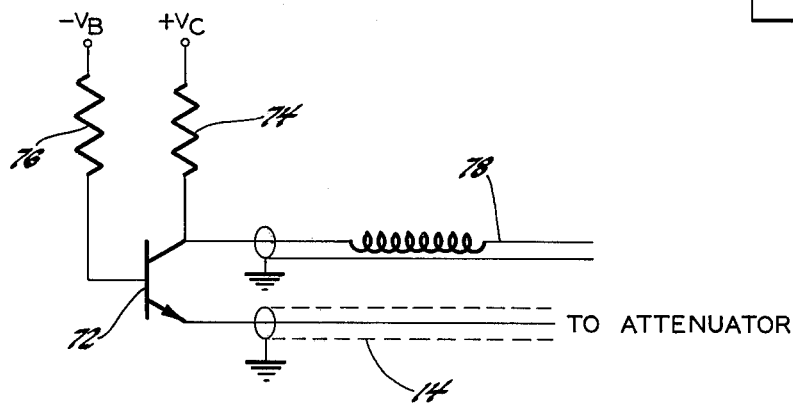
FIG. 2 is a circuit diagram of the pulsing network of FIG. 1 for generating subnanosecond voltage pulses at a high repetition rate.

Referring to FIG. 2, there is illustrated the pulsing network 10 of FIG. 1 for generating subnanosecond voltage pulses at a high repetition rate to control the varactor switch 30 so as to generate subnanosecond coherent RF pulses at the high repetition rate. An NPN avalanche transistor 72 having a high breakdown voltage and high multiplication factor has its emitter coupled to the center conductor of the coaxial cable 14 whose outer shield is grounded. The collector of the transistor 72 is coupled through a resistor 74 to a positive voltage supply $V_C$. The base of the transistor 72 is coupled through a resistor 76 to a negative voltage source $V_B$. A coaxial cable 78 functioning as a delay line has its shield grounded and one end of its center conductor coupled to the collector electrode of the transistor 72, the remaining end being open ended. The delay line 78 has an impedance much less than the impedance of the resistor 74 but has an impedance slightly greater than the impedance seen looking into the radar system from the emitter of the transistor 72.

Figure 3:
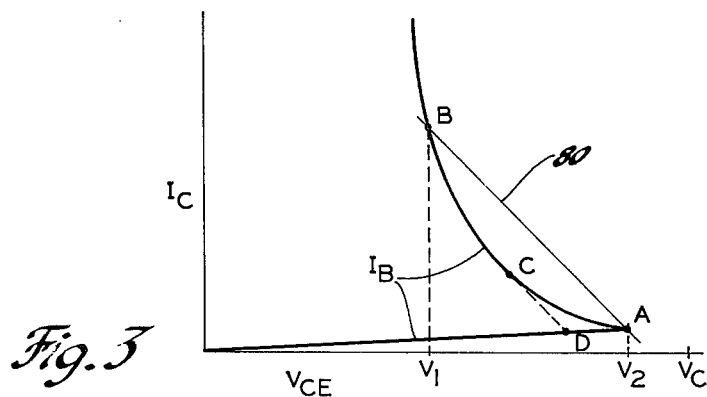
FIG. 3 is a plot illustrating the characteristics and operation of the avalanche transistor of the pulse generator illustrated in FIG. 2.

Referring to FIGS. 2 and 3, the impedance of the resistor 76 is such that the base current of the transistor 72 may be considered a constant value $I_B$. The operating characteristics of the transistor 72 with this constant base current is illustrated in FIG. 3 wherein the collector current $I_C$ is plotted as a function of the collector to emitter voltage $V_{CE}$ for the constant base current $I_B$. A load line 80 for the specific circuit of FIG. 2 is also illustrated.

In operation of the circuit of FIG. 2, the delay line 78 has a capacitance and charges toward the supply voltage $V_C$ which is greater than the voltage $V_2$ of FIG. 3. When the voltage at the collector of the avalanche transistor 72 reaches $V_2$, the transistor is operating at point A on the load line 80. At this operating point, the avalanche transistor 72 is in an "off" state and no voltage is supplied to the coaxial cable 14. As the voltage charge on the delay line 78 increases above $V_2$, avalanche multiplication begins and regeneration is initiated. Since the impedance of the resistor 74 is much greater than the impedance of the delay line 78, the transistor operating point will move from operating point A on the load line 80 to operating point B. At this point, the avalanche transistor 72 is in an "on" state wherein the collector voltage decreases to a value $V_1$ and a positive voltage is generated at the emitter. The voltage transient on the delay line 78 at the collector of the avalanche transistor 72 propagates down the delay line 78 until it reaches the open end where it is reflected and returned to the collector as a positive voltage. The returned voltage transient reduces the voltage across resistor 74 thereby decreasing the current supplied by the positive voltage source $V_C$ and consequently the collector current. A reduction of collector current results in the operating point of the avalanche transistor 72 moving from operating point B to an unstable operating point C which, by means of regeneration, causes the operating point to jump to operating point D wherein the avalanche transistor 72 is again at its "off" state and the positive voltage pulse at the emitter is terminated. At this point, the delay line 78, which discharged through the transistor 72, once more starts to accumulate a charge and the process is repeated. The frequency of this cycle may be, for example, 500 kHz. As can be seen, the reflected voltage transient on the delay line 78 must have a magnitude sufficient to reduce the collector current of the avalanche transistor 72 to cause the operating point to shift to operating point C.

The duration of the voltage pulse at the emitter of the avalanche transistor 72 is equal to the time for the avalanche transistor 72 to switch from operating point A to operating point B and back to operating point C. This duration is approximately equal to the time for the voltage transient to propagate to the end of the delay line 78 and back to the collector of the avalanche transistor 72. To provide for optimal pulse characteristics, the length of the delay line 78 should be such that the time for the voltage transient to propagate to the end thereof and back to the collector of the avalanche transistor 72 is just greater than the time for the avalanche transistor 72 to switch from the operating point A to operating point B. The time for the transistor 72 to switch from operating point A to operating point B may be, for example, 0.75 nanoseconds. To achieve a minimum pulse width at the output of the avalanche transistor 72, the length of the delay line 78 is made so that the time for the voltage transient to propagate to the end thereof and back to the collector of the transistor 72 is approximately 1 nanosecond. The time for the transistor 72 to shift from operating point D of FIG. 3 to operating point A on the load line 80 is determined by the capacitance of the delay line 78 and the impedance of the resistor 74. This time is typically much greater than the width of each of the positive voltage pulses supplied to the coaxial cable 14 and may be, for example, 2,000 nanoseconds.

The magnitude of the voltage pulse generated and coupled to the varactor diode RF switch 30 is greater than the reverse bias voltage from the power supply 22 to reduce the rise time of the output RF pulse and is such that the output RF pulse does not dwell at its peak power level.

A pulsing network as illustrated in FIG. 2 generating subnanosecond voltage pulses at an amplitude of approximately 70 volts and a repetition rate of 500 kHz was implemented using a type 2N5271 avalanche transistor. $+V_C$, $-V_B$, resistor 74 and resistor 76 had the values of +310 volts, −10 volts, 100 k ohms and 18.4 k ohms, respectively. The delay line was comprised of 6 inches of RG 142B cable and had an impedance of approximately 50 ohms with the impedance of the radar system as viewed at the emitter of the 2N5271 avalanche transistor being less than this impedance.

Coherent RF pulses at a repetition rate of 500 kHz, having rise and fall times of less than 1 nanosecond and pulse widths of 1 nanosecond, and having minimum range side lobes were generated by use of the above-described pulsing network in combination with a varactor diode RF switch model S-A 50, SN 001 manufactured by Engelmann Microwave Company, Skyline Drive, Montville, N. J. 07045

What has been described is a system for generating very broad but band-limited subnanosecond RF pulses for a pulse radar system. The pulses generated are confined to a limited portion of the spectrum and achieves maximum resolution with minimal component envelope distortion. Since the pulsed energy is of the coherent carrier variety, coherent detection and mixing may be accomplished in the radar system which reduces the effects of noise and unwanted signals by known integration techniques. Further, as a result of the ultrashort RF pulses generated, various scattering centers of a single target may be detected to permit target identification and evaluation.

The foregoing description of a preferred embodiment of the invention for the purpose of illustrating the principles thereof is not to be considered as limiting or restricting the invention since many modifications may be made by the exercise of skill in the art without departing from the scope of the invention.

What is claimed is as follows:

1. A band-limited RF pulse generator for ultrashort range pulse radar systems comprising: an RF switch, said switch including a varactor diode; means for generating a continuous RF signal: means coupling the RF signal to the RF switch, the RF switch normally attenuating the RF signal and being responsive to a voltage supplied to the varactor diode for transmitting the RF signal; a voltage pulse generator, said voltage pulse generator including an avalanche transistor having base, emitter and collector electrodes, means for biasing the avalanche transistor for operation in its avalanche region, the avalanche transistor switching from an off state to an on state when the voltage across its emitter and collector electrodes exceeds a specified level, a delay line having a first end coupled to the avalanche transistor and the means for biasing the avalanche transistor and an open end, the delay line being charged by the means for biasing the avalanche transistor, the voltage charge on the delay line comprising the voltage across the emitter and collector electrodes of the avalanche transistor, the avalanche transistor being switched from its off state to its on state to discharge the delay line, generate a voltage transient on the delay line and initiate an output voltage pulse when the delay line is charged to a voltage greater than the specified level, the voltage transient on the delay line propagating to and reflecting from the open end thereof and returning to the avalanche transistor to switch the avalanche transistor from its on state to its off state and terminate the output voltage pulse and initiate recharging of the delay line, the delay line having a length so that the time for the voltage transient to propagate to and reflect from the open end of the delay line and return to the avalanche transistor being just greater than the time for the avalanche transistor to switch from its off state to its on state; and means coupling the voltage pulses from the voltage pulse generator to the varactor diode, whereby the voltage pulses drive the RF switch to transmit the RF to generate ultrashort pulse, band-limited RF pulses.

2. A high repetition rate, ultrashort pulse, band-limited RF pulse generator for short range pulse radar systems comprising: an RF switch, said switch including a varactor diode; means for generating a continuous RF signal; means coupling the RF signal to the RF switch, the RF switch attenuating the RF signal in a manner directly proportional to the magnitude of the reverse bias of the varactor diode; means for applying a reverse bias voltage across the varactor diode; a pulse generator, said pulse generator including an avalanche transistor having base, emitter and collector electrodes, means for applying a negative bias voltage to the base electrode, means for supplying a positive bias voltage to the collector electrode through a resistor, the avalanche transistor switching from an off state to an on state when the voltage across its emitter and collector electrodes exceeds a specified level less than the positive bias voltage, a delay line having a first end coupled to the collector electrode and open end and having an impedance much less than the impedance of the resistor, the delay line being charged by the positive bias voltage through the resistor, the avalanche transistor being switched from its off state to its on state to discharge the delay line, generate a voltage transient of the delay line and initiate an output voltage pulse at the emitter electrode when the delay line is charged to a voltage greater than the specified level, the voltage transient on the delay line propagating to and reflecting from the open end thereof and returning to the collector electrode to reduce the collector electrode current and cause the avalanche trnasistor to switch from its on state to its off state and terminate the output voltage pulse and initiate recharging of the delay line through the resistor, the delay line having a length so that the time for the voltage transient to propagate to and reflect from the open end and return to the collector electrode being just greater than the time for the avalanche transistor to switch from its off state to its on state; means coupling the voltage pulses from the emitter electrode across the varactor diode to cause the RF switch to transmit the RF signal coupled thereto, each voltage pulse having a magnitude greater than the reverse bias voltage on the varactor diode, said magnitude being such that the RF signal transmitted by the RF switch during a respective voltage pulse does not dwell at its peak level; and a radar load, said load including the RF switch and having an impedance from the emitter electrode that is less than the impedance of the delay line, whereby the voltage pulses drive the RF switch to transmit high repetition rate, ultrashort, band-limited RF pulses.

* * * * *